United States Patent
Kutrovich et al.

(10) Patent No.: US 12,355,320 B2
(45) Date of Patent: Jul. 8, 2025

(54) WINDING HEAD, STATOR TOOTH, ELECTRIC MOTOR, AND AIRCRAFT

(71) Applicants: Dániel Kutrovich, Pomáz (HU); Zoltán Nádudvari, Pálosvörösmart (HU); János Dorogi, Halásztelek (HU); Gergely György Balazs, Budapest (HU)

(72) Inventors: Dániel Kutrovich, Pomáz (HU); Zoltán Nádudvari, Pálosvörösmart (HU); János Dorogi, Halásztelek (HU); Gergely György Balazs, Budapest (HU)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 511 days.

(21) Appl. No.: 17/099,751

(22) Filed: Nov. 16, 2020

(65) Prior Publication Data
US 2021/0152038 A1 May 20, 2021

(30) Foreign Application Priority Data
Nov. 18, 2019 (EP) .................................... 19209817

(51) Int. Cl.
*H02K 3/52* (2006.01)
*H02K 1/16* (2006.01)
(Continued)

(52) U.S. Cl.
CPC ............... *H02K 3/522* (2013.01); *H02K 1/16* (2013.01); *H02K 3/38* (2013.01); *H02K 3/50* (2013.01); *H02K 15/24* (2025.01)

(58) Field of Classification Search
CPC ........... H02K 3/522; H02K 3/52; H02K 3/527
See application file for complete search history.

(56) References Cited

U.S. PATENT DOCUMENTS

| 2005/0029891 A1* | 2/2005 | Okada ................ H02K 3/522 310/194 |
| 2010/0156204 A1* | 6/2010 | Endo ................. H02K 3/522 310/216.069 |
| 2017/0353063 A1 | 12/2017 | Bell | |

FOREIGN PATENT DOCUMENTS

| FR | 2992493 A1 | 12/2013 | |
| WO | WO-2009007428 A1 * | 1/2009 | ............ H02K 1/146 |
| WO | 2017146117 A1 | 8/2017 | |

OTHER PUBLICATIONS

European Search Report for European Application No. 19209817. 6-1202 dated Jul. 20, 2020.

* cited by examiner

*Primary Examiner* — Livius R. Cazan
(74) *Attorney, Agent, or Firm* — Lempia Summerfield Katz LLC

(57) ABSTRACT

A winding head for a stator tooth of an electric motor is provided. A stator core has a first stator flange and a second stator flange that are joined by a stator joint part. The stator core has an I-shaped cross section perpendicular to a longitudinal elongation with a first end and a second end. The winding head is configured to extend the longitudinal elongation at the first end. The winding head has a first winding head flange and a second winding head flange that are joined by a winding head joint part, and the winding head extends at least partially an elongation of a shape of the stator core. The winding head also has a winding hole at the first winding head flange and a winding opening at the winding head joint part. The winding hole and opening are connected by a groove in the winding head joint part.

9 Claims, 4 Drawing Sheets

(51) Int. Cl.
*H02K 3/38* (2006.01)
*H02K 3/50* (2006.01)
*H02K 15/24* (2025.01)

WINDING HEAD, STATOR TOOTH, ELECTRIC MOTOR, AND AIRCRAFT

This application claims the benefit of European Patent Application No. EP 19209817.6, filed Nov. 18, 2019, which is hereby incorporated by reference in its entirety.

BACKGROUND

The present embodiments relate to a winding head for a stator tooth of an electric motor, a stator tooth for an electric motor, an electric motor for an aircraft, and an aircraft with an electric propulsion system.

Prior art stators for permanent magnet synchronous machines often have stator coils that are machined (e.g., winded directly around single-part stator teeth) and are subsequently assembled radially around a stator axis to achieve a final stator configuration. This procedure usually allows a flexible and simple design of the coils.

However, such stators often have limited fill factors at the stator coil or a low heat transfer between the individual turns of the windings of the stator coil or to the stator coil itself. Hence, the mechanical and electrical performance of the prior art synchronous machines is limited disadvantageously, especially at high operating frequencies.

For example, at aerospace applications, beside the electrical performance, the overall weight of an electrical motor is very important.

SUMMARY AND DESCRIPTION

The scope of the present invention is defined solely by the appended claims and is not affected to any degree by the statements within this summary.

The present embodiments may obviate one or more of the drawbacks or limitations in the related art. For example, an improved stator or enhanced stator components to overcome the disadvantages of prior art stators and subsequently to allow a performance improvement of the stator is provided.

A winding head for a stator tooth of an electric motor is provided. A stator core of the stator tooth has a first stator flange and a second stator flange that are joined by a stator joint part. The stator core has an I-shaped cross section perpendicular to a longitudinal elongation with a first end and a second end. The winding head is configured to extend the longitudinal elongation at the first end. The winding head has a first winding head flange and a second winding head flange that are joined by a winding head joint part. The winding head extends at least partially an elongation of a shape of the stator core. The winding head has a winding hole at the first winding head flange and a winding opening at the winding head joint part. The winding hole and the winding opening are connected by a groove in the winding head joint part.

The stator flanges and the winding head flanges constitute a body with an I-shape in a cross section and a longitudinal elongation. The longitudinal elongation is arranged in an axial direction of the assembled stator such that a winding, arranged around the stator joint part and the winding head joint parts, has a main magnetic flux in operation as an electric motor or generator radially.

The winding head may have a complementary share to the stator core in the direction of the elongation of the stator core in order to provide a shape fit at least partially for improved mechanical characteristics of the combined parts (e.g., a plane surface of a male/female construction).

In a further development, the winding head further has a first winding support structure on the winding head joint part, where the first winding support structure contacts the second winding head flange.

In a further development, the first winding head flange of the winding head further has a bridging part with a reduced thickness in the direction of the longitudinal elongation of the winding head joint part regarding the thickness of the first winding head flange As another example, a stator tooth for an electric motor is provided. The stator tooth includes a stator core, a first winding head according to the present embodiments, a second winding head, and a winding. The first winding head is assembled at the first end of the stator core, and the second winding head is assembled at the second end of the stator core. The winding surrounds the stator core, the first winding head, and the second winding head, and the winding partly runs at the first winding head through the winding hole, the groove, and the winding opening. The winding may have a rectangular cross section, and the stator core may have a stator first winding support structure on the stator joint part, where the stator first winding support contacts the second stator flange.

As yet another example, an electric motor for an aircraft with stator teeth according to the present embodiments is provided.

As another example, an aircraft with an electric propulsion system with an electric motor according to the present embodiments is provided.

DETAILED DESCRIPTION

Figure 1:
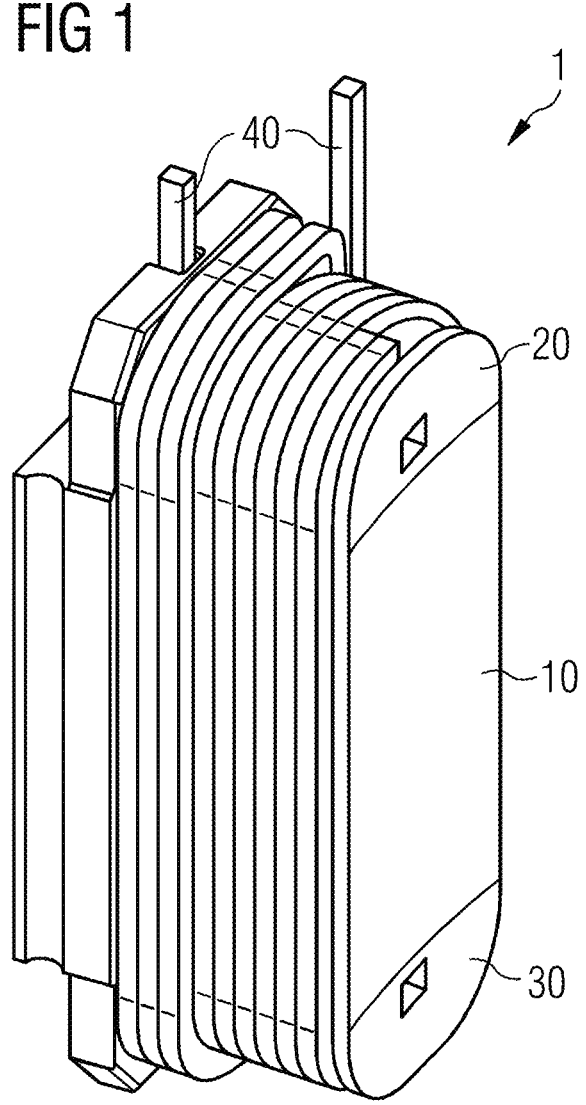
FIG. 1 is a perspective view of an embodiment of a stator tooth.

FIG. 1 shows a perspective view of an embodiment of a stator tooth 1.

Stator teeth 1 may be used, for example, to constitute an electric motor of an aircraft (e.g., for aircraft with an electric propulsion system).

The stator tooth 1 for an electric motor includes a stator core 10, a first winding head 20, a second winding head 30, and a winding 40.

The first winding head 20 is assembled at a first end 15 (see FIG. 2) of the stator core 10.

The second winding head 30 is assembled at a second end 16 (see FIG. 2) of the stator core 10.

The winding 40 surrounds the stator core 10, the first winding head 20, and the second winding head 30. Different winding arrangements may be used for the present embodiments.

In order to optimize the fill factor of the coil, the winding 40 has a rectangular cross section.

Figure 2:
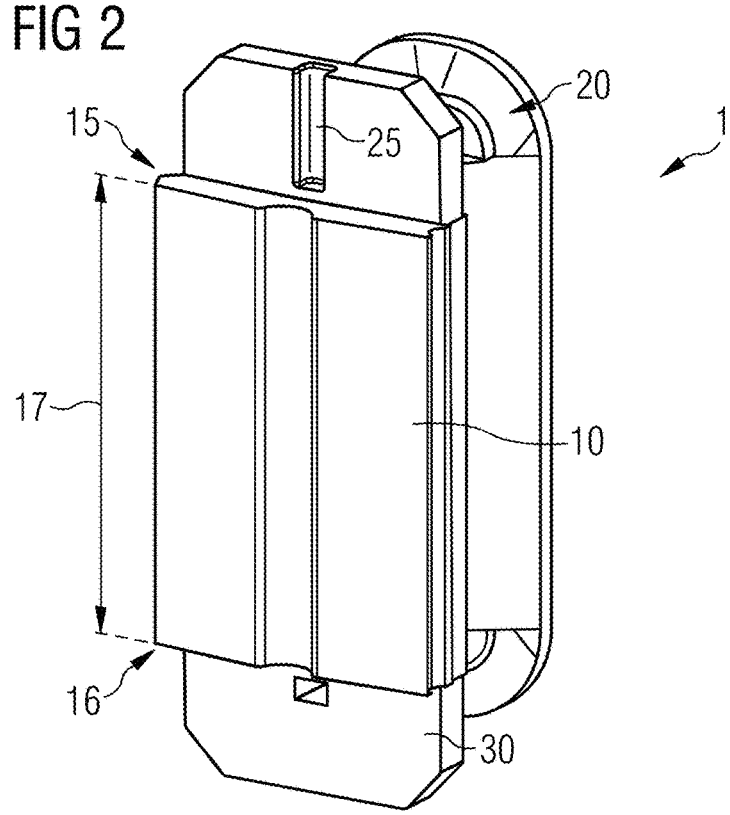
FIG. 2 is a perspective view of a stator core with a winding head of the stator tooth of FIG. 1.
Figure 3:
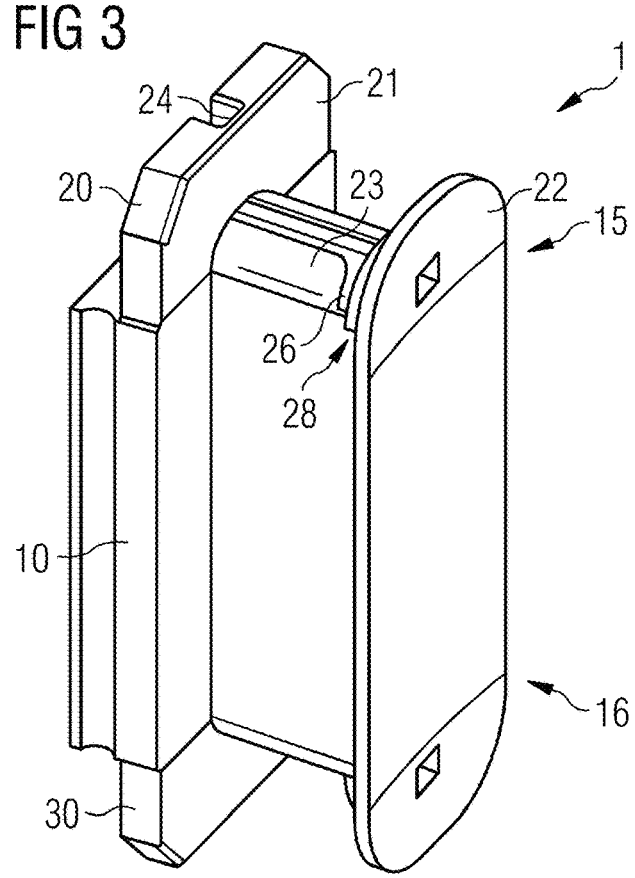
FIG. 3 is a further perspective view of the stator core with the winding head of the stator tooth of FIG. 1.

FIG. 2 and FIG. 3 show perspective views of a stator core 10 with the winding heads 20, 30 and the stator tooth 1.

Figure 7:
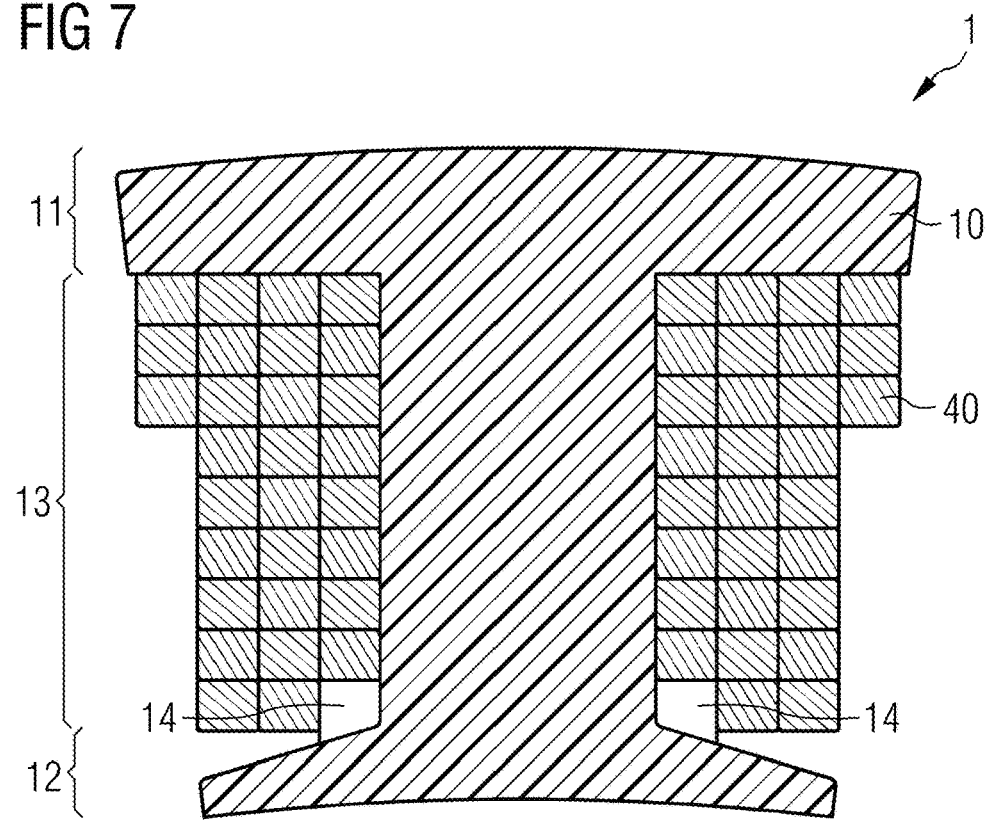
FIG. 7 is a cross section view of the stator core of the stator tooth of FIG. 1.

The stator core 10 has a first stator flange 11 (see FIG. 7) and a second stator flange 12 (see FIG. 7), which are joined by a stator joint part 13 (see FIG. 7).

The stator core 10 has an I-shaped cross section perpendicular to a longitudinal elongation (e.g., length 17 with a first end 15 and a second end 16).

Figure 4:
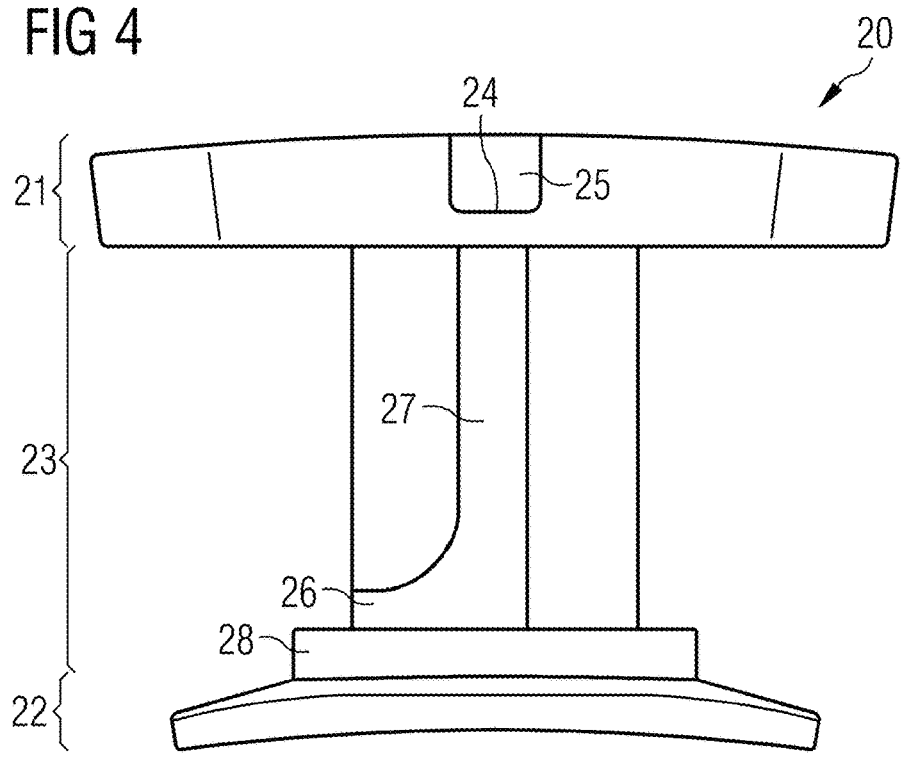
FIG. 4 is a front view of a winding head of the stator tooth of FIG. 1.
Figure 5:
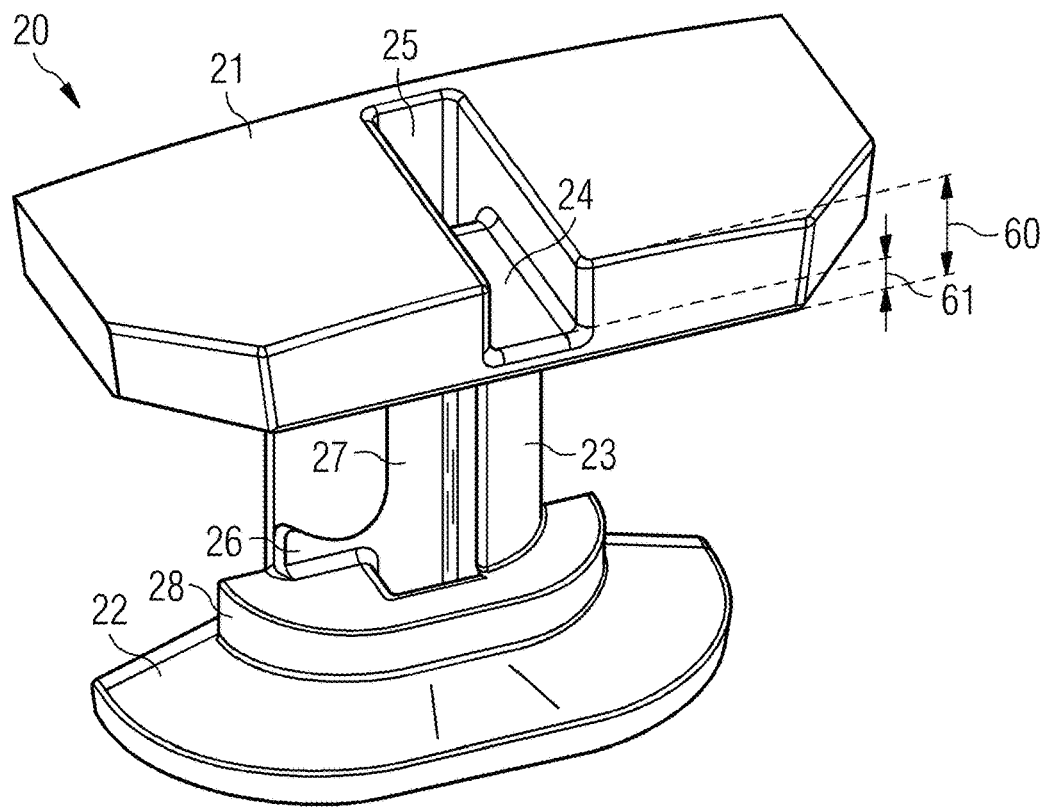
FIG. 5 is perspective view of the winding head of FIG. 4.

FIG. 4 shows a front view of the winding head 20 of the stator tooth 1. FIG. 5 shows a perspective view of the winding head 20.

The winding head 20 is configured to extend the longitudinal elongation 17 at the first end 15 of the stator core 10. Different shapes of the winding head 20 may be used.

The winding head 20 has a first winding head flange 21 and a second winding head flange 22, which are joined by a winding head joint part 23, following the design of the stator core 10 to obtain a very robust stator design for aerospace applications.

Thus, the winding head 20 extends at least partially the elongation of the shape of the stator core 10.

The winding head 20 has a winding hole 25 at the first winding head flange 21 and a winding opening 26 at the winding head joint part 23. The winding hole 25 and the winding opening 26 are connected by a groove 27 in the winding head joint part 23. The groove 27 forms a channel.

By the formed channel, a wire of the winding 40, which forms the coil of the motor, may be placed to the tooth 1 in a way, such that the first winding of the coil is arranged to improve the fill factor of the coil.

For that purpose, the winding head 20 further has a first winding support structure 28 on the winding head joint part 23, where the first winding support structure 28 contacts the second winding head flange 22.

For an easy access of the wire from the side where the longitudinal elongation of the tooth 1 points, the first winding head flange 21 of the winding head 20 further has a bridging part 24 with a reduced thickness 61 in a direction of the longitudinal elongation of the winding head joint part 23 regarding the thickness 60 of the first winding head flange 21. Subsequently, the wire 40 may be turned into that direction. The joint part 23 enables a simple assembly and adjustment of the wire of the winding 40.

Figure 6:
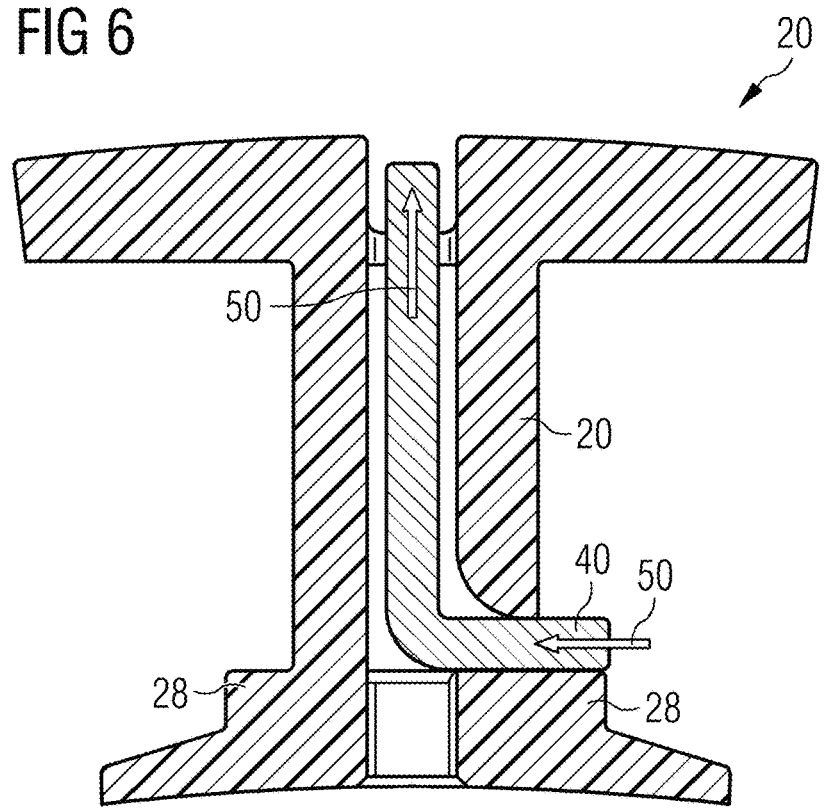
FIG. 6 is a cross section view of the winding head of FIG. 4 with a winding wire.

FIG. 6 shows a cross section view of the winding head 20 with a winding wire 40, which is inserted during the assembly of the stator coil in the direction 50.

FIG. 7 shows a cross section view of the stator core 10 of the stator tooth 1.

In order to further optimize the fill factor of the coil, the winding 40 partly runs at a first turn at the first winding head 20 through the winding hole 25, the groove 27, and the winding opening 26.

The stator core 10 has a stator first winding support structure 14 on the stator joint part 13, where the first winding support structure 14 contacts the second stator flange 12. Thus, the first turn of the coil has an optimal form fit, and the coil has an optimal fill factor.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A winding head for a stator tooth of an electric motor, a stator core of the stator tooth having a first stator flange and a second stator flange that are joint by a stator joint part, wherein the stator core further has an I-shaped cross section perpendicular to a longitudinal elongation with a first end and a second end, the winding head being configured to extend the longitudinal elongation at the first end, the winding head comprising:
    a first winding head flange and a second winding head flange that are joined by a winding head joint part, the winding head extending at least partially an elongation of a shape of the stator core;
    a winding hole extending through a body of the first winding head flange, and a winding opening at the winding head joint part, the winding hole and the winding opening being connected by a groove in the winding head joint part; and
    a bridging part with a reduced thickness in a direction of a longitudinal elongation of the winding head joint part regarding a thickness of the first winding head flange, the bridging part extending between an outer surface of the first winding head flange and the winding hole in a direction perpendicular to the longitudinal elongation of the winding head joint part,
    wherein the winding hole extends through the body of the first winding head flange in a direction parallel with the longitudinal elongation of the winding head joint part, and
    wherein the bridging part partially defines a groove in the first winding head flange, the groove in the first winding head flange extending between the outer surface of the first winding head flange and the winding hole.

2. The winding head of claim 1, further comprising a first winding support structure on the winding head joint part, wherein the first winding support structure contacts the second winding head flange.

3. A stator tooth for an electric motor, the stator tooth comprising:
    a stator core having a first stator flange and a second stator flange that are joint by a stator joint part, wherein the stator core further has an I-shaped cross section perpendicular to a longitudinal elongation with a first end and a second end;
    a first winding head configured to extend the longitudinal elongation at the first end, the first winding head comprising:
        a first winding head flange and a second winding head flange that are joined by a winding head joint part, the first winding head extending at least partially an elongation of a shape of the stator core;
        a winding hole extending through a body of the first winding head flange, and a winding opening at the winding head joint part, the winding hole and the winding opening being connected by a groove in the winding head joint part; and
        a bridging part with a reduced thickness in a direction of a longitudinal elongation of the winding head joint part regarding a thickness of the first winding head flange, the bridging part extending between an outer surface of the first winding head flange and the winding hole in a direction perpendicular to the longitudinal elongation of the winding head joint part;

a second winding head; and a winding, wherein the first winding head is assembled at the first end of the stator core, and the second winding head is assembled at the second end of the stator core, wherein the winding surrounds the stator core, the first winding head, and the second winding head, wherein the winding partly runs at the first winding head through the winding hole, the groove, and the winding opening, wherein the winding hole extends through the body of the first winding head flange in a direction parallel with the longitudinal elongation of the winding head joint part, and wherein the bridging part partially defines a groove in the first winding head flange, the groove in the first winding head flange extending between the outer surface of the first winding head flange and the winding hole.

4. The stator tooth of claim 3, wherein the winding has a rectangular cross section.

5. The stator tooth of claim 4, wherein the stator core has a stator first winding support structure on the stator joint part, and where the stator first winding support structure contacts the second stator flange.

6. The stator tooth of claim 3, wherein the stator core has a stator first winding support structure on the stator joint part, and where the stator first winding support structure contacts the second stator flange.

7. An electric motor for an aircraft, the electric motor comprising:

stator teeth, a stator tooth of the stator teeth comprising:

a stator core having a first stator flange and a second stator flange that are joint by a stator joint part, wherein the stator core further has an I-shaped cross section perpendicular to a longitudinal elongation with a first end and a second end;

a first winding head configured to extend the longitudinal elongation at the first end, the first winding head comprising:

a first winding head flange and a second winding head flange that are joined by a winding head joint part, the first winding head extending at least partially an elongation of a shape of the stator core;

a winding hole extending through a body of the first winding head flange, and a winding opening at the winding head joint part, the winding hole and the winding opening being connected by a groove in the winding head joint part; and a bridging part with a reduced thickness in a direction of a longitudinal elongation of the winding head joint part regarding a thickness of the first winding head flange, the bridging part extending between an outer surface of the first winding head flange and the winding hole in a direction perpendicular to the longitudinal elongation of the winding head joint part, a second winding head; and a winding, wherein the first winding head is assembled at the first end of the stator core, and the second winding head is assembled at the second end of the stator core, wherein the winding surrounds the stator core, the first winding head, and the second winding head, wherein the winding partly runs at the first winding head through the winding hole, the groove, and the winding opening, wherein the winding hole extends through the body of the first winding head flange in a direction parallel with the longitudinal elongation of the winding head joint part, and wherein the bridging part partially defines a groove in the first winding head flange, the groove in the first winding head flange extending between the outer surface of the first winding head flange and the winding hole.

8. An aircraft comprising:

an electric propulsion system comprising:

an electric motor comprising:

stator teeth, a stator tooth of the stator teeth comprising:

a stator core having a first stator flange and a second stator flange that are joint by a stator joint part, wherein the stator core further has an I-shaped cross section perpendicular to a longitudinal elongation with a first end and a second end;

a first winding head configured to extend the longitudinal elongation at the first end, the first winding head comprising:

a first winding head flange and a second winding head flange that are joined by a winding head joint part, the first winding head extending at least partially an elongation of a shape of the stator core;

a winding hole extending through a body of the first winding head flange, and a winding opening at the winding head joint part, the winding hole and the winding opening being connected by a groove in the winding head joint part; and a bridging part with a reduced thickness in a direction of a longitudinal elongation of the winding head joint part regarding a thickness of the first winding head flange, the bridging part extending between an outer surface of the first winding head flange and the winding hole in a direction perpendicular to the longitudinal elongation of the winding head joint part, a second winding head; and a winding, wherein the first winding head is assembled at the first end of the stator core, and the second winding head is assembled at the second end of the stator core, wherein the winding surrounds the stator core, the first winding head, and the second winding head, wherein the winding partly runs at the first winding head through the winding hole, the groove, and the winding opening, wherein the winding hole extends through the body of the first winding head flange in a direction parallel with the longitudinal elongation of the winding head joint part, and wherein the bridging part partially defines a groove in the first winding head flange, the groove in the first winding head flange extending between the outer surface of the first winding head flange and the winding hole.

9. The winding head of claim 1, wherein the groove in the first winding head flange extends in a first direction, the first direction being between the outer surface of the first winding head flange and the winding hole, wherein the winding hole extends through the first winding head flange in a second direction, the second direction being at an angle relative to the first direction.

\* \* \* \* \*